US012703361B2

(12) United States Patent
Engman et al.

(10) Patent No.: US 12,703,361 B2
(45) Date of Patent: Aug. 11, 2026

(54) CONTROL ARRANGEMENT AND METHOD FOR CONTROLLING VEHICLE SPEED

(71) Applicant: Scania CV AB, Södertälje (SE)

(72) Inventors: Marcus Engman, Tullinge (SE); Susanna Jacobsson, Huddinge (SE); Jonas Udd, Stockholm (SE)

(73) Assignee: Scania CV AB, Södertälje (SE)

(*) Notice: Subject to any disclaimer, the term of this patent is extended or adjusted under 35 U.S.C. 154(b) by 111 days.

(21) Appl. No.: 18/665,748

(22) Filed: May 16, 2024

(65) Prior Publication Data

US 2024/0391458 A1 Nov. 28, 2024

(30) Foreign Application Priority Data

May 23, 2023 (SE) .................................... 2350618-1

(51) Int. Cl.
*B60W 30/14* (2006.01)
*B60W 50/00* (2006.01)

(52) U.S. Cl.
CPC ...... *B60W 30/143* (2013.01); *B60W 50/0097* (2013.01); *B60W 2720/10* (2013.01)

(58) Field of Classification Search
CPC ........... B60W 30/143; B60W 50/0097; B60W 2720/10; B60W 2510/305; B60W 10/30; B60W 30/18072; B60W 30/18109; B60W 30/1888; B60W 40/072; B60W 40/076; B60W 2552/15; B60W 2552/20
See application file for complete search history.

(56) References Cited

U.S. PATENT DOCUMENTS 9,340,208 B1 5/2016 Kuros et al.
2007/0260381 A1* 11/2007 Sah ...................... B60W 20/40 701/51
2010/0022348 A1* 1/2010 Jonsson ........... B60W 30/1888 477/52
2013/0179007 A1* 7/2013 Dalum ................. H01M 10/48 701/2
2013/0179043 A1 7/2013 Byttebier et al.
2015/0126328 A1* 5/2015 Banker .......... B60W 30/18109 180/65.265

(Continued)

FOREIGN PATENT DOCUMENTS

DE 102011118543 A1 * 5/2012 ........ B60W 50/0097
DE 102017210252 A1 * 12/2017 ........... G08G 1/0112

(Continued)

OTHER PUBLICATIONS

DE-102011118543-A1 translation (Year: 2012).*

(Continued)

*Primary Examiner* — Kyle T Johnson
(74) *Attorney, Agent, or Firm* — Moore & Van Allen PLLC; W. Kevin Ransom

(57) ABSTRACT

A control arrangement and a method for controlling vehicle speed of a vehicle using a cruise control system are provided. The vehicle comprises a power take-off connected to a powertrain of the vehicle. The method comprises a step of, in response to a determination that the power take-off is subjected to a load, predicting future braking torque resulting from the power take-off load. The method further comprises a step of determining a planned driving strategy for an upcoming road section taking into account the predicted future braking torque. The method further comprises controlling the powertrain in accordance with the planned driving strategy, thereby controlling vehicle speed of the vehicle.

15 Claims, 3 Drawing Sheets

(56) References Cited

U.S. PATENT DOCUMENTS

| | | | | |
|---|---|---|---|---|
| 2016/0082962 | A1 | 3/2016 | Dolesh et al. | |
| 2017/0265398 | A1* | 9/2017 | Retzlaff | A01F 15/0875 |
| 2017/0370319 | A1* | 12/2017 | Homant | F02D 41/3005 |
| 2018/0084723 | A1* | 3/2018 | Gresch | A01B 67/00 |
| 2018/0135744 | A1* | 5/2018 | Kuang | B60W 50/0097 |
| 2018/0290645 | A1* | 10/2018 | Zhao | B60W 50/0097 |
| 2020/0398843 | A1* | 12/2020 | Sabbatini | B60T 7/122 |
| 2022/0080971 | A1* | 3/2022 | Bolger | B60W 30/182 |
| 2023/0174051 | A1* | 6/2023 | Goossens | B60K 17/28 |
| 2024/0391458 | A1* | 11/2024 | Engman | B60W 30/143 |
| 2025/0065894 | A1* | 2/2025 | Luo | B60W 50/0205 |

FOREIGN PATENT DOCUMENTS

| | | | | |
|---|---|---|---|---|
| SE | 543885 | C2 | 9/2021 | |
| WO | 2007030069 | A1 | 3/2007 | |
| WO | WO-2009132720 | A1 * | 11/2009 | B60W 30/18109 |
| WO | 2013006118 | A1 | 1/2013 | |
| WO | 2014088490 | A1 | 6/2014 | |
| WO | 2016200309 | A1 | 12/2016 | |

OTHER PUBLICATIONS

WO-2009132720-A1 translation (Year: 2009).*

DE-102017210252-A1 translation (Year: 2017).*

A novel manoeuver stability controller based on vehicle state prediction and intellectual braking (Year: 2019).*

Norheim, E., et al., "Energy prediction of electric trucks' auxiliaries", MSc Thesis, Chalmers University of Technology (2022) [https://hdl.handle.net/20.500.12380/304698].

Scania CV AB, Swedish Patent Application No. 2350618-1, Office Action, Dec. 20, 2023.

* cited by examiner

CONTROL ARRANGEMENT AND METHOD FOR CONTROLLING VEHICLE SPEED

CROSS-REFERENCE TO RELATED APPLICATIONS

This application claims priority to Swedish Patent Application No. 2350618-1 filed May 23, 2023, of the same title; the contents of which are hereby incorporated by reference.

TECHNICAL FIELD

The present disclosure relates in general to a method for controlling vehicle speed of a vehicle using a cruise control system. The present disclosure further relates in general to a control arrangement configured to control vehicle speed of a vehicle using a cruise control system, and to a cruise control system comprising said control arrangement. Moreover, the present disclosure relates in general to a computer program and a computer-readable medium. The present disclosure also relates in general to a vehicle.

BACKGROUND

Cruise controls that automatically controls the travelling speed of a vehicle are common in modern vehicles today. When activated, a cruise control eliminates the need of a driver to operate an accelerator pedal in order to maintain the vehicle speed and thereby improves driver comfort. A cruise control may also reduce the energy consumption of the vehicle during operation, and can therefore lead to reduced operating costs. There are various types of cruise controls, which are configured to operate according to different control functions and therefore may result in different effects on for example the operation of the vehicle.

One example thereof is a traditional cruise control that aims at maintaining a substantially constant vehicle speed, such as a set speed selected by a driver of the vehicle. Such a traditional cruise control may often be referred to as a constant speed cruise control. A constant speed cruise control is typically configured to maintain the vehicle speed within a narrow allowable speed range about the set speed and with the aim to maintain the vehicle speed at the set speed. A constant speed cruise control thus controls the vehicle with the aim to maintain the set speed set regardless of whether the vehicle is travelling uphill, downhill or on a horizontal running surface. This means that the vehicle may be accelerated over the crest of a hill, only to be braked on a subsequent downgrade to avoid a too high vehicle speed. This is an uneconomic way of running the vehicle, particularly in the case of heavy vehicles, since it may often unduly increase the energy consumption of the vehicle and hence the operating costs (such as fuel costs).

Another type of cruise control is a predictive cruise control, sometimes also referred to as a look-ahead cruise control. A predictive cruise control is a cruise control which uses information regarding an upcoming road section, i.e. a road section ahead of the vehicle, and plans a driving strategy for the upcoming road section based on said information. The information regarding the upcoming road section may typically include at least topographic data and data relating to the curvature or the like of the upcoming road section, but could also for a more advanced predictive cruise control include information relating to for example traffic situation ahead of the vehicle and/or speed limits. The data may typically be derived from map data in combination with information regarding geographical positioning of the vehicle, but may in some situations also be supplemented with for example historical data relating to previous instances that the vehicle, or another vehicle, has travelled the upcoming road section. The predictive cruise control then controls the operation of the vehicle powertrain in accordance with the planned driving strategy as the vehicle travels the road section in question, which thereby results in the vehicle speed varying in accordance with a vehicle speed profile.

A predictive cruise control can save substantial amounts of energy compared to a constant speed cruise control. For example, in case the upcoming road section comprises an uphill followed by a downhill, the vehicle may be accelerated so as to, at the crest of the hill, have a speed which is lower than the set speed in situations where the vehicle speed may be increase during the downhill as a result of the gravitational force so as to reach the set speed. In order to take advantage of the positive effect obtainable by a predictive cruise control, the allowable speed range of the vehicle for such a cruise control is typically considerably broader than the allowable speed range of a constant speed cruise control. However, a predictive cruise control requires sufficiently accurate information regarding future conditions to which the vehicle will be subjected in order to function as intended. This means that it may not always be possible to use a predictive cruise control, for example in situations of loss of information or where there may be unknown factors affecting the operation of the vehicle. Thus, it may not always be possible to take advantage of energy savings obtainable by means of a predictive cruise control.

Both a constant speed cruise controller and a predictive cruise controller may sometimes also be supplemented by an adaptive cruise control function, if desired. The adaptive cruise control function is configured to automatically adjust the vehicle speed in order to maintain a safe distance (or desired distance) to other road users ahead of the vehicle. An adaptive cruise control function typically uses information from sensors arranged in or on the vehicle, such as radar, laser or image capturing devices (such as cameras), for the purpose of obtaining information regarding such other road users in front of the vehicle.

SUMMARY

The object of the present invention is to enable further energy savings while using a cruise control system for controlling vehicle speed of a vehicle and thereby reduce the total operating costs for said vehicle.

The object is achieved by the subject-matter of the appended independent claim(s).

The present disclosure provides a method, performed by a control arrangement, for controlling vehicle speed of a vehicle using a cruise control system. The vehicle comprises a power take-off configured to power an auxiliary power consumer, said power take-off being connected to a powertrain of the vehicle. The method comprises a step of, in response to a determination that the power take-off is subjected to a load, predicting future braking torque resulting from the power take-off load. The method further comprises a step of determining a planned driving strategy for an upcoming road section taking into account the predicted future braking torque. The method also comprises a step of controlling the powertrain of the vehicle in accordance with the planned driving strategy, thereby controlling vehicle speed of the vehicle.

By means of the herein described method, the number of situations in which a predictive cruise control function may be used for controlling the vehicle speed is increased. More specifically, the herein described method enables usage of a predictive cruise control function also in situations where an auxiliary power consumer may be powered by the vehicle powertrain. This in turn leads to a lower energy consumption of the vehicle and thus a reduced total cost of operation.

The step of predicting future braking torque resulting from the power take-off load may comprise predicting future braking torque based on determined current power take-off load. This enables utilizing the herein described method also in situations where information regarding when the auxiliary power consumer is intended to be in use and/or the power need of the auxiliary power consumer is not already available to the cruise control system, such as by being pre-specified by for example a manufacturer of the auxiliary power consumer, a body builder, an owner of the vehicle, and/or a driver of the vehicle. Thus, predicting future braking torque based on determined current power take-off load may further increase the number of situations a predictive cruise control function may be used for controlling vehicle speed, and thereby also enable further energy savings in the operation of the vehicle.

The step of predicting future braking torque resulting from the power take-off load may comprise monitoring current power take-off load for at least a preselected period of time to determine possible variations in power take-off load over time. Thereby, the accuracy in the determination of the current power take-off may be improved, which in turn increases the accuracy in the prediction in of future braking torque resulting from the power take-off load. When the method comprises monitoring current power take-off load for at least a preselected period of time to determine possible variations in power take-off load, the step of predicting future braking torque resulting from the power take-off load may further comprise, in response to a determination that possible variations in current power take-off load are within a predefined range, predicting said future braking torque to correspond to a braking torque resulting from the determined current power take-off load.

The method may further comprise, in response to a determination that possible variations in current power take-off load are outside the predefined range, analyzing the determined variations in current power take-off load to identify which parameter or parameters the variations in current power take-off load depends on. In such a case, the method may further comprise, when the identified parameter or parameters on which the variations depend belong to the group consisting of time and one or more operating parameters of the vehicle powertrain which can be predicted, predicting future braking torque resulting from the power take-off load taking into account said identified parameter or parameters on which the variations depend. This further improves the accuracy in predicted future braking torque resulting from the power take-off load, and thus also further reduces the risk of the powertrain of the vehicle being controlled in accordance with an undesirable driving strategy while controlling vehicle speed by use of the cruise control system. When the parameter or parameters on which the variations in current power take-off load depend cannot be identified or belong to a group of parameters whose future change cannot be predicted, the method may comprise determining that a future braking torque resulting from the power take-off load cannot be predicted. Thereby, it is further ensured that the powertrain of the vehicle is not controlled in accordance with an undesirable or inappropriate driving strategy while controlling vehicle speed by use of the cruise control system.

The current power take-off load may for example be determined by estimation based on a parameter defined by at least one sensor arranged in the vehicle powertrain, by estimation based on determined fluid pressure produced by a power take-off fluid pump, by measurement using a torque sensor arranged at a shaft of the power take-off, and/or based on information obtained from a power take-off interface.

The method may further comprise a step of, in response to a determination that the power is subjected to a load and that a future braking torque resulting from the power take-off load cannot be predicted, controlling the vehicle speed in accordance with a constant speed cruise control function configured to maintain vehicle speed within a predefined vehicle speed range about a set speed. Thereby, the vehicle speed of the vehicle may be controlled by the cruise control system even in situations where the future braking torque resulting from the power take-off load cannot be predicted.

The present disclosure further relates to a computer program comprising instructions which, when executed by a computer, cause the computer to carry out the method as described above.

The present disclosure further relates to a computer-readable medium comprising instructions which, when executed by a computer, cause the computer to carry out the method as described above.

Moreover, the present disclosure further provides a control arrangement configured to control vehicle speed of a vehicle using a cruise control system. Said vehicle comprises a power take-off configured to power an auxiliary power consumer, wherein the power take-off is connected to a powertrain of the vehicle. The control arrangement is configured to, in response to a determination that the power take-off is subjected to a load, predict future braking torque resulting from the power take-off load. The control arrangement is further configured to determine a planned driving strategy for an upcoming road section taking into account the predicted future braking torque. Moreover, the control arrangement is configured to control the powertrain of the vehicle in accordance with the planned driving strategy using the cruise control system, thereby controlling vehicle speed of the vehicle.

The control arrangement provides the same advantages as described above with reference to the corresponding method for controlling vehicle speed of a vehicle using a cruise control system.

The control arrangement may further be configured to predict future braking torque resulting from the power take-off load based on determined current power take-off load.

The present disclosure further provides a cruise control system for a vehicle wherein the cruise control system comprises the control arrangement described above.

Moreover, the present disclosure further provides a vehicle comprising the control arrangement described above. The vehicle may be a land-based heavy vehicle, such as a bus or a truck. Moreover, the vehicle may a vehicle driven by a combustion engine, a fully electrical vehicle, or a hybrid vehicle. The vehicle may be a vehicle configured to a driven fully or in part by a driver. Alternatively, the vehicle may be a fully autonomous vehicle.

DETAILED DESCRIPTION

Figure 1:
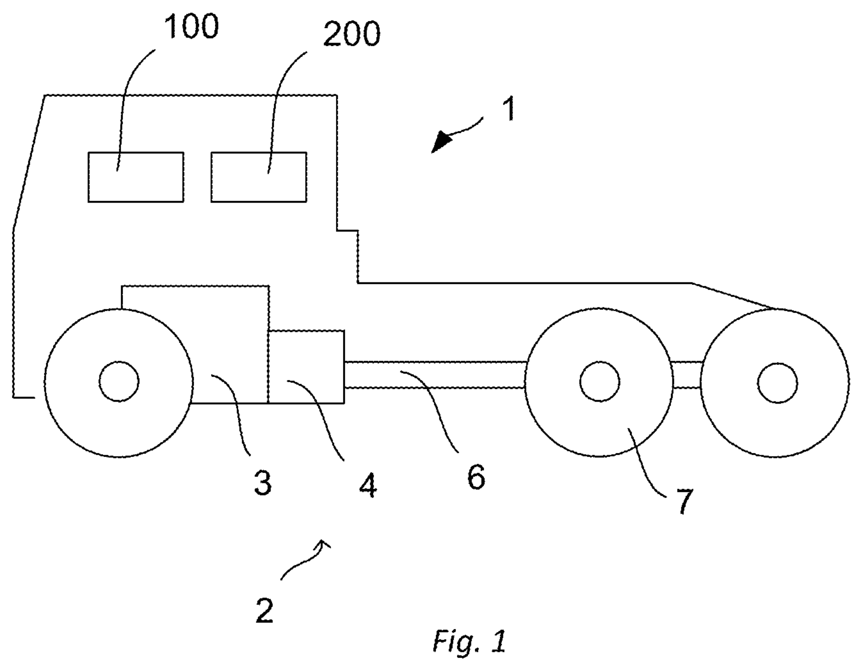
FIG. 1 schematically illustrates a side view of an example of a vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In the present disclosure, the term "driver" shall be considered to encompass both a driver present in a vehicle as well as a driver controlling the vehicle but not being present in the vehicle, such as a driver controlling the vehicle from a remote control center or the like.

Moreover, the term "upcoming road section" is herein used to describe a section of the road in front of a vehicle, and which said vehicle is about to travel on. The upcoming road section may suitably be a road section essentially immediately in front of the vehicle, but the present disclosure is not limited thereto. The upcoming road section may for example start a few meters in front of the vehicle.

Vehicle powertrains usually comprises at least one power unit connected to the drive wheels of the vehicle via various shafts and one or more gearboxes to transform the output torque of the power unit to a greater torque on the drive wheels. In addition to propelling the vehicle, a vehicle powertrain may also be used to drive one or more auxiliary devices. Such auxiliary devices are herein also denominated auxiliary power consumers. Examples of auxiliary power consumers include pumps, cranes, mixers, compressors or the like, but are not limited thereto. For the purpose of enabling powering one or more such auxiliary power consumers, the vehicle comprising the powertrain may comprise one or more power take-offs operatively connected to the vehicle powertrain and configured to transmit energy from the vehicle powertrain to an auxiliary power consumer connected thereto. It should here be noted that a power take-off may also be regarded to constitute a constituent component of the powertrain as such.

A power take-off may for example be connected to a lay shaft of a gearbox. Thereby, the lay shaft may drive the auxiliary power consumer by virtue of rotational energy from the lay shaft being transmitted to the power take-off. A power take-off may also be connected to for example a main shaft of the gearbox via a cogwheel arrangement. A power take-off may alternatively be connected to the vehicle powertrain outside the gearbox. For example, a power take-off may be arranged on a shaft of the power unit, or be connected to the flywheel of the power unit.

When an auxiliary power consumer is operatively connected to a power take-off so as to be powered by the vehicle powertrain, it results in a load on power take-off and thus also on the vehicle powertrain. This load may affect the operation of the vehicle powertrain for the purpose of propelling the vehicle as it consumes energy from the vehicle powertrain. A vehicle manufacturer is typically not aware of which auxiliary power consumer(s) a customer, a body builder or a user of the vehicle intends to connect to the vehicle powertrain, and in particular not when such auxiliary power consumers, if connected, may consume energy and the resulting loss of energy in the vehicle powertrain. The control of the vehicle powertrain (such as requested torque from power unit, gear selection, etc.) during driving is in general not adapted to a power take-off load since this load is usually not known. Instead, corrective measures are usually implemented to compensate for loss of propulsion torque when it for example is determined that the vehicle speed does not correspond to the targeted vehicle speed. This also means that only constant speed cruise control functions are used for controlling vehicle speed of a vehicle when it is determined that an auxiliary power consumer is connected to a power take-off, i.e. when it is determined that a power take-off is subjected to a load.

However, the herein described method for controlling vehicle speed of a vehicle using a cruise control system enables using predictive cruise control functions also in situations where at least one power take-off of the vehicle is subjected to a load. This is enabled through the method comprising predicting future braking torque on the vehicle powertrain, said braking torque resulting from the power take-off load. Predicting the future braking torque resulting from the power take-off load enables taking this into account when determining an appropriate driving strategy for an upcoming road section in essentially the same way as taking into account for example a braking torque resulting from any brake system of the vehicle. It should here be noted that the predicted future braking torque may in some situations be fairly constant. However, in many situations, the predicted future braking torque may vary for example over time.

The present disclosure provides a method for controlling vehicle speed of a vehicle using a cruise control system and is applicable to vehicles which comprises at least one power take-off configured to power an auxiliary power consumer when such an auxiliary power consumer is connected thereto. The cruise control system comprises (or consists of) at least a predictive cruise control and usually also a constant speed cruise control. The cruise control system may further comprise an adaptive cruise control function, if desired, for example for the purpose of increasing road safety. Described differently, the cruise control system may be configured to control vehicle speed in accordance with different types of cruise control functions, including a predictive cruise control function and a constant speed cruise control function and optionally also an adaptive cruise control function.

A predictive cruise control is herein considered to mean a cruise control which is configured to use information regarding road characteristics ahead of the vehicle and, based on said information, plan a driving strategy for the upcoming road section and thereafter control the operation of the vehicle (more specifically, the vehicle powertrain) in accordance with said driving strategy as the vehicle travels said road section. The driving strategy is determined in consideration of a set speed and a predefined allowable speed range which in turn is dependent of said set speed. The driving strategy may be aimed at achieving an energy efficient operation of the vehicle. The set speed may typically be selected by a driver of the vehicle and represents the vehicle speed the driver wishes the vehicle to essentially maintain. Alternatively, the set speed may be selected by a control system of the vehicle e.g. in consideration of legal requirements relating to the upcoming road section (such as speed limit) and in consideration of a speed selected by the driver. Typically, a predictive cruise control is configured to at least consider the characteristics of topography and curvature of the upcoming road section. Such information may for example be derived from map data when used in combination with geographical positioning of the vehicle.

A predictive cruise control may for example be configured to determine a suitable driving strategy for the upcoming road section based on simulation of a plurality of vehicle speed profiles for various driving strategies for the upcoming road section, and selecting the simulated vehicle speed profile which appears to be the most appropriate from the plurality of simulated vehicle speed profiles as the planned driving strategy to be used for the control of vehicle speed. Typically, the driving strategy resulting in the most energy efficient vehicle speed profile, which is able to keep the vehicle speed within the allowable vehicle speed range, is thereafter selected as the planned driving strategy. However, other factors, such as driver comfort and/or time to reach a destination, may also be considered when selecting among the simulated vehicle speed profiles. A simulated vehicle speed profile defines simulated vehicle speed at different distance points along the upcoming road section and at least comprises the extreme points, i.e. the simulated maximum vehicle speed together with its associated distance point as well as the simulated minimum vehicle speed with its associated distance point. The simulated vehicle speed profile may comprise or consist of a plurality of simulated discrete values of vehicle speed at various distance points along the road section. Suitably, the simulated vehicle speed profile may be a simulated continuous vehicle speed profile. Simulation of a vehicle speed profile for an upcoming road section is nowadays well known to a person skilled in the art and will therefore not be described in detail here. Examples of factors that may typically be considered in such a simulation, in addition to characteristics of the upcoming road section (such as topography, curvature of road etc.), include for example vehicle configuration, vehicle load etc. Advanced simulations of vehicle speed profiles for upcoming road sections may also take into consideration additional factors, such as weather conditions and/or traffic situation.

In contrast to a predictive cruise control, a constant speed cruise control (or a constant speed cruise control function) is not configured to plan a driving strategy based on the characteristics of the upcoming road section but is rather configured to act based on current operating conditions of the vehicle and determined current vehicle speed. Like the predictive cruise control, the constant speed cruise control is aimed at essentially maintaining a set speed selected by a driver or a control system of the vehicle. However, the predefined allowable speed range around the set speed is typically narrower for a constant speed cruise control than for a predictive cruise control in order to ensure that the cruise control is able to essentially maintain the set speed even if for example reaching a steep uphill grade.

An adaptive cruise control function is herein considered to mean a cruise control function which is configured to decrease (and sometimes also increase) the vehicle speed depending on the distance to another road user in front of the vehicle whose speed is controlled by the cruise control system.

The herein described method for controlling vehicle speed of a vehicle using a cruise control system comprises a step of, in response to a determination that the power take-off is subjected to a load, predicting future braking torque resulting from the power take-off load. The method further comprises a step of determining a planned driving strategy for an upcoming road section taking into account the predicted future braking torque. Naturally, also characteristics of the upcoming road section, such as topography and curvature, are taken into account when determining the planned driving strategy. Moreover, the method comprises a step of controlling the powertrain of the vehicle in accordance with the planned driving strategy, thereby controlling vehicle speed of the vehicle.

The method may further comprise a step of determining whether the power take-off is subjected to a load. In the present disclosure, a power take-off is considered to be subjected to a load when the power take-off is operatively connected to an auxiliary power consumer. Thus, the step of determining whether the power take-off is subjected to a load may alternatively be described as a step of determining whether an auxiliary power consumer is operatively connected to the power take-off. It should here be noted that an auxiliary power consumer connected to a power take-off load may result in a braking torque on the vehicle powertrain even in situations when the auxiliary power consumer is in a non-operative state even though said braking torque may, depending on characteristics of the auxiliary power consumer, may be so low that it would not substantially affect the operation of the vehicle powertrain. Moreover, as soon as there is an auxiliary power consumer operatively connected to a power take-off, there is a likelihood that there may be a loss of energy from the vehicle powertrain that may necessitate a change in the operation of the vehicle powertrain when seeking to control the vehicle speed. Therefore, the above described step of predicting future braking torque of the herein described method should be performed in response to a determination that the power take-off is subjected to a load (i.e. that an auxiliary power consumer is operatively connected to the power take-off). Determining whether the power take-off is subjected to a load may be performed in accordance with any previously known method therefore, and will therefore not be described in detail herein. Alternatively, the method may comprise a step of receiving information that the power take-off is subjected to a load. This may be performed by the control arrangement, configured to perform the herein described method, receiving said information from another control arrangement or control system of the vehicle.

In view of the fact that the future braking torque resulting from the power take-off load is predicted in order to be able to take this into account for determining a planned driving strategy for an upcoming road section, the step of predicting future braking torque resulting from the power take-off load may suitably comprise predicting the future braking torque resulting form the power take-off load as the vehicle travels the upcoming road section.

The above described step of predicting future braking torque resulting from the power take-off load may be performed based on information regarding intended use and power consumption of an auxiliary power consumer in case such information is already available to, or retrievable by, the control arrangement. Such information regarding intended use and power consumption of the auxiliary device may for example be available to the control arrangement via an interface configured therefore, and may for example be provided by a manufacturer of the relevant auxiliary power consumer, a body builder, an owner of the vehicle and/or a driver of the vehicle.

Alternatively, or additionally, the step of predicting future braking torque resulting from the power take-off load may comprise predicting future braking torque based on determined current power take-off load. For said purpose, the method may further comprise a step of determining current power take-off load, or obtaining such information from another control arrangement of the vehicle. Determined current power take-off load is herein considered to comprise at least the magnitude of the power take-off load at the point in time when it is determined, and optionally also possible variations in the magnitude of the power take-off load during the time period during which it is determined as will be further explained below.

The current power take-off load may according to a first alternative be determined by estimation based on a parameter determined by at least one sensor arranged in the vehicle powertrain. According to one example, said parameter determined by the at least one sensor may be a parameter resulting from a reaction force in a shaft of the vehicle powertrain (for example a shaft of the power take-off or a shaft connected thereto). More specifically, the parameter may be a pressure force resulting from a reaction force in said shaft and said sensor may be a strain gauge bridge. The sensor may for example be attached directly to said shaft or incorporated into a bearing or the like of the vehicle powertrain.

The current power take-off load may according to a second alternative be determined by estimation based on determined fluid pressure produced by a power take-off fluid pump. An example of how to estimate current power take-off load based on determined fluid pressure produced by a power take-off fluid pump is given in US 2010/0022348 A1.

The current power take-off load may according to a third alternative be determined by measurement using a torque sensor arranged at a shaft of the power take-off. Such torque sensors are known in the art and will therefore not be further described in the present disclosure.

The current power take-off load may according to a fourth alternative be determined based on information obtained from a power take-off interface. A power take-off interface is herein considered to mean an interface which is configured to, continuously or at regular intervals, transfer data (i.e. information) from an auxiliary power consumer, connected to a power take-off of the vehicle, to the control arrangement configured to perform the herein described method. Said transferred data may comprise at least the power consumption of the auxiliary power consumer.

The above described first to fourth alternatives for determining the current power take-off load may be used individually, or be used in any combination of two or more alternatives, if desired.

The step of predicting future braking torque resulting from the power take-off load may comprise a sub-step of monitoring current power take-off load for at least a preselected period of time to determine possible variations in power take-off load over time. Said monitoring may comprise repeating the above described step of determining current power take-off load a plurality of times during said preselected period of time, such as at regular time intervals. The step of monitoring current power take-off load for a preselected period of time may for example be performed before activating the cruise control system for the purpose of controlling the vehicle speed of the vehicle. It may for example be performed at the start of travel of the vehicle, before it reaches a road section at which it is likely that a driver of the vehicle activates the cruise control system. Alternatively, the step of monitoring current power take-off load for a preselected period of time may be performed while the cruise control system is operative, i.e. controlling the vehicle speed of the vehicle. In such a case, said monitoring of the current power take-off load may suitably, but not necessarily, be performed while the cruise control system uses another cruise control function than a predictive cruise control function, such as a constant speed cruise control function.

In case it is determined that the possible variations in current power take-off load are within a predetermined range, the future braking torque may be predicted to correspond to the braking torque resulting from the determined current power take-off load. Described differently, in case it is determined that there are no variations in the current power take-off load during the preselected period of time or that the possible variations are so small that the power take-off load may be regarded as substantially constant, the future braking torque may be assumed to correspond to the braking torque resulting from the current power take-off load (i.e. a current braking torque on the vehicle powertrain resulting from the power take-off load).

The method may further comprise, in response to a determination that possible variations in current power take-off load are outside the predefined range, analyzing the determined variations in current power take-off load to identify which parameter or parameters the variations depends on. The step of analyzing the determined variations in current power take-off load serves the purpose of identifying a pattern of the determined variations in current power take-off load which explains the reason for said variations. In situations where the cause of the variations of the current power take-off load can be identified, it is possible to also consider these parameters when predicting the future braking torque. As an example, in case it is found that the power take-off load varies with a repeatable pattern which is solely time-dependent, this can easily also be considered when predicting the future braking torque. Moreover, in case it is found that the current power take-off load varies with a known parameter of the vehicle powertrain, for example a rotational speed of a shaft or gear, this may also be incorporated into the prediction of the future braking torque in case such a parameter may in turn be predicted for the future. Thus, when the identified parameter or parameters on which the variations depend belong to the group consisting of time and one or more operating parameters of the vehicle powertrain which can be predicted (i.e. whose future value may be predicted), the method may comprise predicting future braking torque resulting from the power take-off load taking into account said identified parameter or parameters on which the variations depend. However, when the parameter or parameters on which the variations cannot be identified, or belong to a group of parameters whose future change cannot be predicted, it may be determined that a future braking torque resulting from the power take-off load cannot be predicted.

The method may further comprise, in response to a determination that the power take-off is subjected to a load and that a future braking torque from the power take-off load cannot be predicted, controlling the vehicle speed of the vehicle in accordance with a constant speed cruise control function configured to maintain vehicle speed within a predefined vehicle speed range about a set speed. In other words, in case the power take-off load is subjected to a load but it is not possible to predict the future braking torque resulting from said load, the vehicle speed is not controlled in accordance with a predictive cruise control function but a constant speed cruise control function.

The performance of the herein described method for controlling vehicle speed of a vehicle using a cruise control system may be governed by programmed instructions. These programmed instructions may take the form of a computer program which, when executed by a computer, cause the computer to effect desired forms of control action. Such a computer may for example be comprised in the control arrangement as described herein. A computer is in the present disclosure considered to mean any hardware or hardware/firmware device implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit, or any other device capable of electronically performing operations in a defined manner.

The above described programmed instructions, which may take the form of a computer program, may be stored on a computer-readable medium. Hence, the present disclosure also relates to a computer-readable medium storing instructions, which when executed by computer, cause the computer to carry out the herein described method. The computer-readable medium may be a non-transitory computer-readable medium, such as a tangible electronic, magnetic, optical, infrared, electromagnetic, and/or semiconductor system, apparatus, and/or device.

The present disclosure further relates to a control arrangement configured to control vehicle speed of a vehicle using a cruise control system. The control arrangement may be configured to perform any one of the steps of the method for controlling vehicle speed of a vehicle using a cruise control system as described herein.

More specifically, in accordance with the present disclosure, a control arrangement configured to control vehicle speed of a vehicle using a cruise control system is provided. Said vehicle comprises a power take-off configured to power an auxiliary power consumer, said power take-off being connected to a powertrain of the vehicle. The control arrangement is configured to, in response to a determination that the power take-off is subjected to a load, predict future braking torque resulting from the power take-off load. The control arrangement is further configured to determine a planned driving strategy for an upcoming road section taking into account the predicted future braking torque. Moreover, the control arrangement is configured to control the powertrain of the vehicle in accordance with the planned driving strategy using the cruise control system, thereby controlling vehicle speed of the vehicle.

The control arrangement may further be configured to determine whether the power take-off is subjected to a load. Alternatively, the control arrangement may be configured to receive information that it has been determined that the power take-off is subjected to a load from a remote source, such as any other controller of the vehicle.

The control arrangement may be configured to predict future braking torque resulting from the power take-off load based on a determined current power take-off load. For said purpose, the control arrangement may be configured to determine current power take-off load. The control arrangement may also be configured to monitor current power take-off load for at least a preselected period of time so as to also enable determining possible variations in power take-off load over time. Alternatively, the control arrangement may be configured to receive information regarding a determined current power-take off load from a remote source, such as another controller of the vehicle.

The control arrangement may comprise one or more control units. In case of the control arrangement comprising a plurality of control units, each control unit may be configured to control a certain function or a certain function may be divided between more than one control units. The control arrangement may be a control arrangement of a cruise control system of the vehicle. Alternatively, the control arrangement may be separate from the cruise control system, but configured to communicate therewith for the purpose of controlling vehicle speed by means of the cruise control system. The control arrangement may also be comprised in any other controller of the vehicle, if desired. Furthermore, the control arrangement may be arranged in the vehicle. It is however also plausible that one or more control units of the control arrangement may be arranged at a remote control center or the like, and configured to communicate with one or more control units of the control arrangement arranged onboard the vehicle.

FIG. 1 schematically illustrates a side view of an example of a vehicle 1, here illustrated as a truck, whose vehicle speed (i.e. travelling speed) may be controlled by the herein described method. The vehicle 1 comprises a powertrain 2 comprising a combustion engine 3, serving as a power unit, and a gearbox 4. The combustion engine 3 may be connected to the gearbox 4 via a clutch 5 (compare with FIG. 2). The gearbox 4 may be connected to the driving wheels 7 of the vehicle 1 via an output shaft 6 of the gearbox 4. The output shaft 6 of the gearbox 4 and the driving wheels 7 constitute parts of the vehicle powertrain 2.

The vehicle 1 comprises a control arrangement 100 configured to control vehicle speed of the vehicle using a cruise control system 200 of the vehicle. The control arrangement 100 may be a part of the cruise control system 200, or be separate from the cruise control system 200 but configured to communicate therewith for the purpose of performing the herein described method.

As previously mentioned, the present disclosure is not limited to a vehicle driven by a combustion engine. The vehicle 1 may optionally be a hybrid vehicle, in which case the vehicle comprises at least one electrical machine (not shown) in addition to the combustion engine 3, said electrical machine serving as a power unit. Alternatively, the vehicle may be a fully electric vehicle in which case the vehicle 1 does not comprise the combustion engine 3. The vehicle 1 may suitably be a land-based heavy vehicle, such as a bus or a truck, but is not limited thereto.

Figure 2:
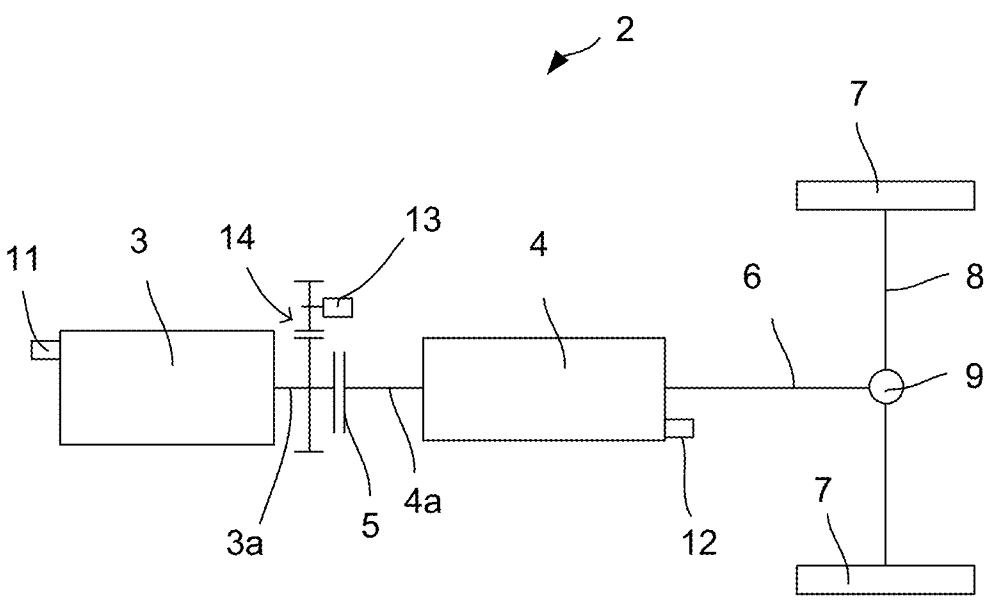
FIG. 2 schematically illustrates an example of a vehicle powertrain.

FIG. 2 schematically illustrates an example of a powertrain 2 of a vehicle, such as the vehicle 1 shown in FIG. 1. The powertrain 2 comprises a combustion engine 3 and a gearbox 4. The combustion engine 3 comprises an output shaft **3*a* connectable to an input shaft 4*a* of the gearbox by a clutch 5. The output shaft 6 of the gearbox 4 may be connected to a drive shaft 8, with its associated drive wheels 7, via a differential 9. One or more power take-offs may be connected to the vehicle powertrain 2. For example, a first power take-off 11 may be connected to a shaft (other than the output shaft 3*a*) of the combustion engine 3. A second power take-off 12 may be connected to a shaft of the gearbox 4, for example a lay shaft (not shown) of the gearbox 4. A third power take-off 13 may be connected to the output shaft 3*a* of the combustion engine via a gearwheel arrangement 14**.

Figure 3:
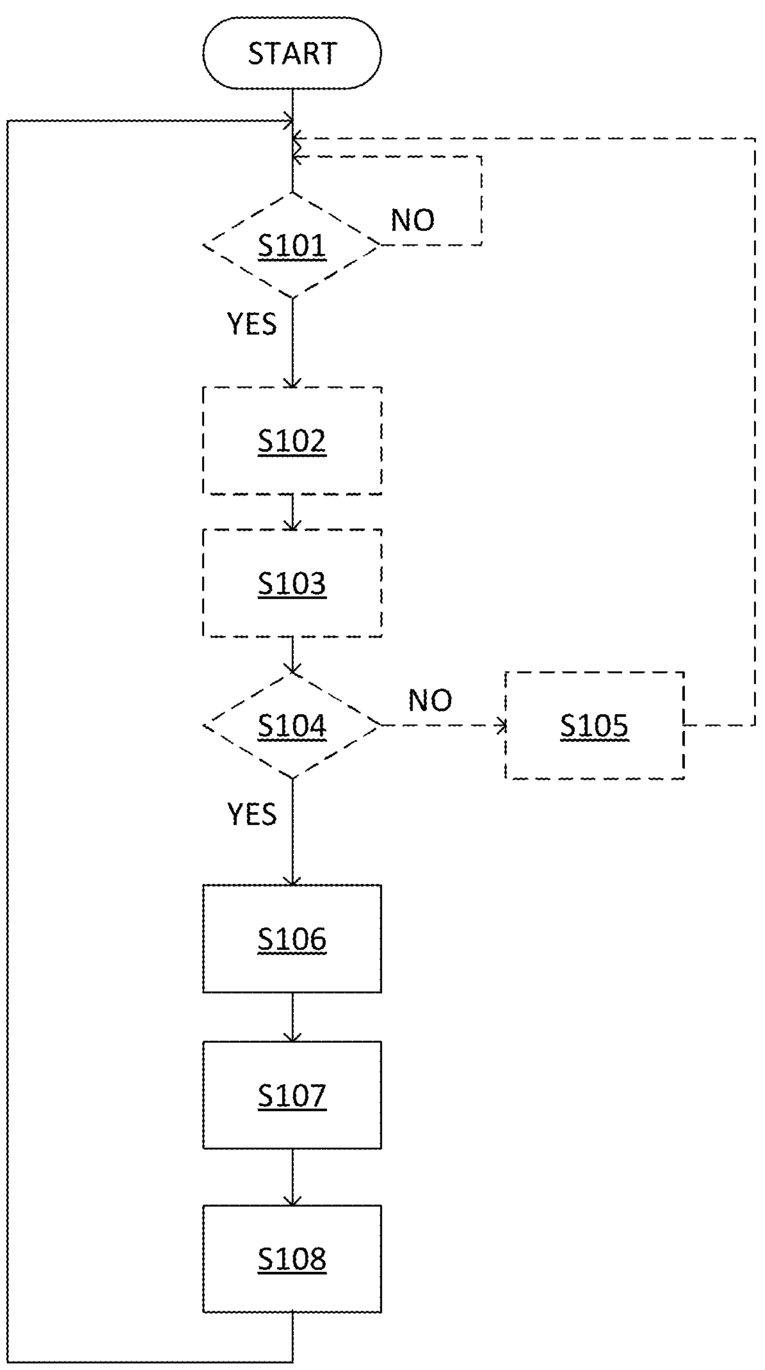
FIG. 3 represents a flowchart schematically illustrating one exemplifying embodiment of the method for controlling vehicle speed of a vehicle using a cruise control system as described herein, FIG. 4 schematically illustrates an exemplifying embodiment of a device which may comprise, consist of, or be comprised in a control arrangement configured to perform the herein described method.

FIG. 3 represents a flowchart schematically illustrating one exemplifying embodiment of the herein described method for controlling vehicle speed of a vehicle using a cruise control system. Optional steps of the exemplified embodiment are illustrated with dashed lines.

The method may comprise a step S101 of determining whether the power take-off is subjected to a load. In case it is determined that the power take-off is not subjected to a load, the method may be reverted to start. However, in case it is determined that the power take-off is subjected to a load, the method continues to a subsequent step.

The method may further comprise a step S102 of monitoring current power take-off load for a preselected period of time to determine current power take-off load and possible variations in power take-off load over time.

Furthermore, the method may comprise a step S103 of analyzing the possible variations in current power take-off load (determined in step S102) to identify which parameter or parameters the possible variations depend on.

The method may further comprise a step S104 of determining whether a future braking torque on the vehicle powertrain, said future braking torque resulting from the power take-off load, can be predicted. Said determination may for example be made based on whether there is sufficient information available in order to sufficiently accurately make such a prediction, for example based on the result of steps S102 and S103. In case said future braking torque cannot be predicted, the method may proceed to a step S105 of controlling the vehicle speed in accordance with a constant speed cruise control function. After step S105, the method may be reverted to start.

The method comprises a step S106 of, in response to a determination that the power take-off is subjected to a load, predicting a future braking torque (on the vehicle powertrain) resulting from the power take-off load. The future braking torque may be predicted based on determined current power take-off load and, where applicable, the parameter or parameters the possible variations depend on as identified in optional step S102. It should here be noted that although the optional steps S102-S104 described above are illustrated as being separate from step S106 for sake of clarity, any one of steps S102-S104 may in fact be regarded to constitute a part of step S106.

In case the method does not comprise the steps S102-S104, step S106 may be made based on information regarding intended use and power consumption of an auxiliary power consumer in case such information is already available to, or retrievable by, the control arrangement. Such information regarding intended use and power consumption of the auxiliary device may for example be available to the control arrangement via an interface configured therefore, and may for example be provided by a manufacturer of the relevant auxiliary power consumer, a body builder, an owner of the vehicle and/or a driver of the vehicle.

The method further comprises a step S107 of determining a planned driving strategy for an upcoming road section taking into account the predicted future braking torque obtained from step S106.

Thereafter, the method comprises a step S108 of controlling the powertrain of the vehicle in accordance with the planned driving strategy, determined in step S107. Thereby, the vehicle speed is controlled accordingly as the vehicle travels the upcoming road section. Thereafter, the method may be reverted to start.

Figure 4:
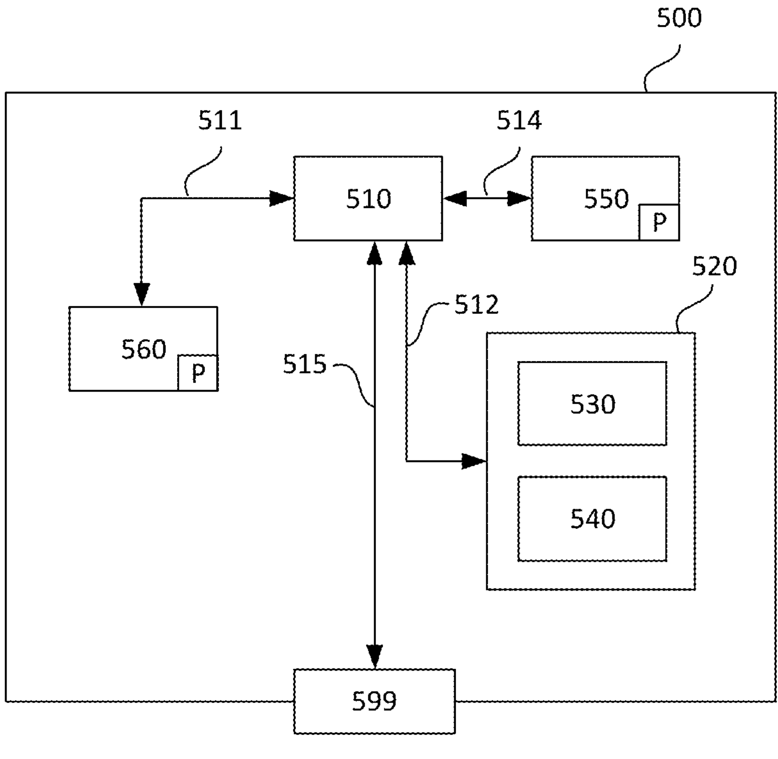

FIG. 4 schematically illustrates an exemplifying embodiment of a device 500. The control arrangement 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling vehicle speed of a vehicle using a cruise control system. Said vehicle comprises power take-off configured to power an auxiliary power consumer, said power take-off being connected to a powertrain of the vehicle. The computer program comprises instructions for, in response to a determination that the power take-off is subjected to a load, predict future braking torque resulting from the power take-off load. The computer program further comprises instructions for determining a planned driving strategy for an upcoming road section taking into account the predicted future braking torque. The computer program further comprises instructions for controlling the powertrain of the vehicle in accordance with the planned driving strategy, thereby controlling vehicle speed of the vehicle.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

The invention claimed is:

1. A method, performed by a control arrangement, for controlling vehicle speed of a vehicle using a cruise control system, said vehicle comprising a power take-off configured to power an auxiliary power consumer, the power take-off being connected to a powertrain of the vehicle said method comprising:

in response to a determination that the power take-off is subjected to a load, predicting future braking torque that will be applied to the powertrain by the power take-off during an upcoming road section as a result of the power take-off load;

determining a planned driving strategy for the upcoming road section, where the strategy takes into account the effects of predicted future braking torque to the powertrain; and controlling the powertrain of the vehicle in accordance with the planned driving strategy, thereby controlling vehicle speed of the vehicle.

2. The method according to claim 1, wherein predicting future braking torque resulting from the power take-off load comprises predicting future braking torque based on determined current power take-off load.

3. The method according to claim 2, wherein the current power take-off load is determined one or more of:

by estimation based on a parameter determined by at least one sensor arranged in the vehicle powertrain, by estimation based on determined fluid pressure produced by a power take-off fluid pump, by measurement using a torque sensor arranged at a shaft of the power take-off, and/or based on information obtained from a power take-off interface.

4. The method according to claim 1, wherein predicting future braking torque resulting from the power take-off load comprises:

monitoring current power take-off load for at least a preselected period of time to determine possible variations in power take-off load over time; and in response to a determination that possible variations in current power take-off load are within a predefined range, predicting said future braking torque to correspond to a braking torque resulting from the determined current power take-off load.

5. The method according to claim 4, further comprising:

in response to a determination that possible variations in current power take-off load are outside the predefined range, analyzing the determined variations in current power take-off load to identify which parameter or parameters the variations depends on; and when the identified parameter or parameters on which the variations depend belong to the group consisting of time and one or more operating parameters of the vehicle powertrain which can be predicted, predicting future braking torque resulting from the power take-off load taking into account said identified parameter or parameters on which the variations depend; or when the parameter or parameters on which the variations depend cannot be identified or belong to a group of parameters whose future change cannot be predicted, determining that a future braking torque resulting from the power take-off load cannot be predicted.

6. The method according to claim 1, further comprising:

in response to a determination that the power take-off is subjected to a load and that a future braking torque resulting from the power take-off load cannot be predicted, controlling the vehicle speed in accordance with a constant speed cruise control function configured to maintain vehicle speed within a predefined vehicle speed range about a set speed.

7. A computer program product stored on a non-transitory computer-readable medium, said computer program product for controlling vehicle speed of a vehicle using a cruise control system, said vehicle comprising a power take-off configured to power an auxiliary power consumer, the power take-off being connected to a powertrain of the vehicle, wherein said computer program product comprising computer instructions to cause one or more computer processors to perform the following operations:

in response to a determination that the power take-off is subjected to a load, predicting future braking torque that will be applied to the powertrain by the power take-off during an upcoming road section as a result of the power take-off load;

determining a planned driving strategy for the upcoming road section, where the strategy takes into account the effects of predicted future braking torque to the powertrain; and controlling the powertrain of the vehicle in accordance with the planned driving strategy, thereby controlling vehicle speed of the vehicle.

8. A control arrangement configured to control vehicle speed of a vehicle using a cruise control system, said vehicle comprising a power take-off configured to power an auxiliary power consumer, the power take-off being connected to a powertrain of the vehicle, wherein the control arrangement is configured to:

in response to a determination that the power take-off is subjected to a load, predict future braking torque that will be applied to the powertrain by the power take-off during an upcoming road section as a result of the power take-off load;

determine a planned driving strategy for the upcoming road section, where the strategy takes into account the effects of predicted future braking torque to the powertrain; and control the powertrain of the vehicle in accordance with the planned driving strategy using the cruise control system, thereby controlling vehicle speed of the vehicle.

9. The control arrangement according to claim 8, wherein the control arrangement is configured to predict future braking torque resulting from the power take-off load based on determined current power take-off load.

10. The control arrangement according to claim 8, wherein predicting future braking torque resulting from the power take-off load comprises:

monitoring current power take-off load for at least a preselected period of time to determine possible variations in power take-off load over time; and in response to a determination that possible variations in current power take-off load are within a predefined range, predicting said future braking torque to correspond to a braking torque resulting from the determined current power take-off load.

11. The control arrangement according to claim 10, further configured to:

in response to a determination that possible variations in current power take-off load are outside the predefined range, analyzing the determined variations in current power take-off load to identify which parameter or parameters the variations depends on; and when the identified parameter or parameters on which the variations depend belong to the group consisting of time and one or more operating parameters of the vehicle powertrain which can be predicted, predicting future braking torque resulting from the power take-off load taking into account said identified parameter or parameters on which the variations depend; or when the parameter or parameters on which the variations depend cannot be identified or belong to a group of parameters whose future change cannot be predicted, determining that a future braking torque resulting from the power take-off load cannot be predicted.

12. The control arrangement according to claim 8, wherein the current power take-off load is determined one or more of:

by estimation based on a parameter determined by at least one sensor arranged in the vehicle powertrain, by estimation based on determined fluid pressure produced by a power take-off fluid pump, by measurement using a torque sensor arranged at a shaft of the power take-off, and/or based on information obtained from a power take-off interface.

13. The control arrangement according to claim 8, further configured to:

in response to a determination that the power take-off is subjected to a load and that a future braking torque resulting from the power take-off load cannot be predicted, controlling the vehicle speed in accordance with a constant speed cruise control function configured to maintain vehicle speed within a predefined vehicle speed range about a set speed.

14. A cruise control system for a vehicle, the cruise control system comprising a control arrangement configured to control vehicle speed of the vehicle using the cruise control system, said vehicle comprising a power take-off configured to power an auxiliary power consumer, the power take-off being connected to a powertrain of the vehicle; wherein the control arrangement is configured to: in response to a determination that the power take-off is subjected to a load, predict future braking torque that will be applied to the powertrain by the power take-off during an upcoming road section as a result of the power take-off load; determine a planned driving strategy for the upcoming road section, where the strategy takes into account the effects of predicted future braking torque to the powertrain; and control the powertrain of the vehicle in accordance with the planned driving strategy using the cruise control system, thereby controlling vehicle speed of the vehicle.

15. A vehicle comprising:

a power take-off configured to power an auxiliary power consumer, the power take-off being connected to a powertrain of the vehicle; and a control arrangement configured to control vehicle speed of the vehicle using a cruise control system, wherein the control arrangement is configured to:

in response to a determination that the power take-off is subjected to a load, predict future braking torque that will be applied to the powertrain by the power take-off during an upcoming road section as a result of the power take-off load;

determine a planned driving strategy for the upcoming road section, where the strategy takes into account the effects of predicted future braking torque to the powertrain; and control the powertrain of the vehicle in accordance with the planned driving strategy using the cruise control system, thereby controlling vehicle speed of the vehicle.

* * * * *